United States Patent
Woodhouse et al.

(10) Patent No.: US 8,950,796 B2
(45) Date of Patent: Feb. 10, 2015

(54) SEATING ARRANGEMENT FOR A PASSENGER VEHICLE

(71) Applicant: Ford Global Technologies, LLC, Dearborn, MI (US)

(72) Inventors: David Woodhouse, Bromsgrove (GB); Torsten Gerhardt, London (GB); Robert Spahl, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/076,964

(22) Filed: Nov. 11, 2013

(65) Prior Publication Data
US 2014/0152042 A1   Jun. 5, 2014

(30) Foreign Application Priority Data

Dec. 4, 2012 (GB) .................................. 1221811.1
Oct. 16, 2013 (GB) .................................. 1318279.5

(51) Int. Cl.
*B60N 2/00* (2006.01)
*B60N 2/01* (2006.01)

(52) U.S. Cl.
CPC ........................................ *B60N 2/01* (2013.01)
USPC ........................................ 296/64; 296/65.06

(58) Field of Classification Search
CPC ........................................................ B60N 2/01
USPC .............................................. 296/64, 65.01, 65.06
See application file for complete search history.

(56) References Cited

U.S. PATENT DOCUMENTS

| | | | | |
|---|---|---|---|---|
| 1,214,897 A | * | 2/1917 | Clarke | 180/89.1 |
| 1,760,422 A | * | 5/1930 | Mackie | 280/166 |
| 2,839,312 A | * | 6/1958 | Barenyi et al. | 280/775 |
| 3,352,597 A | * | 11/1967 | Barenyi et al. | 296/181.1 |
| 3,685,854 A | * | 8/1972 | Cadiou | 180/90.6 |

(Continued)

FOREIGN PATENT DOCUMENTS

| | | |
|---|---|---|
| DE | 19702572 A1 | 2/1998 |
| DE | 19916179 A1 | 10/2000 |

(Continued)

OTHER PUBLICATIONS

Madabout News, "MEV announce the new R2," Dec. 12, 2007 (3 pages), Madabout kitcars.com.

(Continued)

*Primary Examiner* — Lori L Lyjak
(74) *Attorney, Agent, or Firm* — Vichit Chea; Price Heneveld LLP (57) ABSTRACT

A seating assembly for a vehicle includes a central longitudinal axis extending through the vehicle. A front seat is configured for use by a driver and defines a front seat central longitudinal axis. A rear seat is configured for use by a passenger and defines a rear seat central longitudinal axis. The front and rear seats are substantially arranged on opposite sides of the central longitudinal axis in a staggered relationship. The central longitudinal axis of the front seat is arranged at a different angle with respect to the central longitudinal axis of the vehicle than the central longitudinal axis of the rear seat. At least one of the seats is positioned such that the central longitudinal axis of the respective seat measured at a rear edge of the seat is mounted closer to the central longitudinal axis of the vehicle than is possible with a symmetrical side-by-side seating arrangement.

20 Claims, 7 Drawing Sheets

(56) References Cited

U.S. PATENT DOCUMENTS

| | | | |
|---|---|---|---|
| 3,694,025 A * | 9/1972 | Buehrig | 296/64 |
| 4,218,092 A | 8/1980 | Schach et al. | |
| 4,382,628 A * | 5/1983 | Palmgren | 297/232 |
| 4,489,972 A * | 12/1984 | Monzini | 296/64 |
| 5,435,624 A | 7/1995 | Bray et al. | |
| 5,456,019 A | 10/1995 | Dowell et al. | |
| 5,716,026 A * | 2/1998 | Pascasio et al. | 244/118.6 |
| 5,737,845 A | 4/1998 | Marasus | |
| 7,938,488 B2 * | 5/2011 | Thiel et al. | 297/312 |
| 8,267,456 B2 * | 9/2012 | Murray | 296/64 |
| 8,523,281 B2 | 9/2013 | Wahls | |
| 2007/0241235 A1 | 10/2007 | Atchison | |
| 2010/0148557 A1 * | 6/2010 | Schmitz | 297/362 |
| 2010/0187850 A1 * | 7/2010 | Murray | 296/64 |
| 2011/0304191 A1 * | 12/2011 | Markel et al. | 297/408 |

FOREIGN PATENT DOCUMENTS

| | | | |
|---|---|---|---|
| DE | 102007060818 A1 | 6/2009 | |
| EP | 0669245 A1 | 8/1995 | |
| FR | 2826616 A1 | 1/2003 | |
| FR | 2961142 A1 | 12/2011 | |
| GB | 1012559 | 8/1964 | |
| GB | 1358783 | 7/1974 | |
| WO | 8200618 | 3/1982 | |
| WO | 9903377 A1 | 1/1999 | |
| WO | 2008110814 A2 | 9/2008 | |
| WO | 2009083773 A1 | 7/2009 | |
| WO | 2013111167 A1 | 8/2013 | |

OTHER PUBLICATIONS

Honest John, "Volkswagen unveils XL1 concept car," Jan. 25, 2011 (3 pages), Honestjohn.co.uk.

Chappell, Dale, "Bugatti Type 23 'Brescia', staggered seating detail, c1926," Feb. 1, 2011 (2 pages), Chappells 10.

Quick, Darren, "Audi urban concept defies conventional categorization," Aug. 9, 2011 (9 pages), Gizmag.

Taylor, Alfred, "Amazing world of three-wheeled vehicles," Sep. 22, 2011 (18 pages), Judgmental.

SAE International, "Devices for Use in Defining and Measuring Vehicle Seating Accommodation," 2014 (1 page).

Jalopy journal.com, "An Early Factory Hot Rod, The Jesse Vincent Speedster," date unknown (13 pages), Lexis Legal Community.

Early American automobiles.com, "History of Early American Automobile Industry 1891-1929," date unknown (30 pages).

USPTO, Office Action for U.S. Appl. No. 14/076,919, dated May 22, 2014 (11 pages).

* cited by examiner

SEATING ARRANGEMENT FOR A PASSENGER VEHICLE

CROSS-REFERENCE TO RELATED APPLICATIONS

The present application is related to co-pending U.S. patent application Ser. No. 14/076,919, filed Nov. 11, 2013, entitled "SEATING ARRANGEMENT FOR A PASSENGER VEHICLE"; co-pending U.S. patent application Ser. No. 14/076,928, filed Nov. 11, 2013, entitled "SEATING ARRANGEMENT FOR A PASSENGER VEHICLE"; co-pending U.S. patent application Ser. No. 14/076,942, filed Nov. 11,2013, entitled "MOTOR VEHICLE SEAT HAVING AN ARMREST"; co-pending U.S. patent application Ser. No. 14/076,956, filed Nov. 11, 2013, entitled "SEATING ARRANGEMENT FOR A PASSENGER VEHICLE"; and co-pending U.S. patent application Ser. No. 14/076,969, filed Nov. 11, 2013, entitled "SEATING ARRANGEMENT FOR A PASSENGER VEHICLE", all of which are incorporated herein by reference in their entireties.

FIELD OF THE INVENTION

The present invention generally relates to a seating arrangement for a powered passenger vehicle that is particularly suitable for fitment to a vehicle having small overall dimensions.

BACKGROUND OF THE INVENTION

A common problem faced by modern car users is the lack of parking space in cities and large towns. In an effort to provide more parking there has been a trend by local authorities to reduce the size of parking bays so as to provide more parking bays along a given length of road.

Therefore in summary there is a need to provide a passenger motor vehicle that is relatively short and narrow so as to permit three of such vehicles to use a single parking bay without causing an obstruction to passing traffic and a staggered seating arrangement is the best option for achieving this.

SUMMARY OF THE INVENTION

According to one aspect of the present invention, a seating assembly for a vehicle includes a central longitudinal axis extending through the vehicle. A front seat is configured for use by a driver and defines a front seat central longitudinal axis. A rear seat is configured for use by a passenger and defines a rear seat central longitudinal axis. The front and rear seats are substantially arranged on opposite sides of the central longitudinal axis of the vehicle in a staggered relationship. The central longitudinal axis of the front seat is arranged at a different angle with respect to the central longitudinal axis of the vehicle than the central longitudinal axis of the rear seat. At least one of the seats is positioned such that the central longitudinal axis of the respective seat measured at a rear edge of the seat is mounted closer to the central longitudinal axis of the vehicle than is possible with a symmetrical side-by-side seating arrangement.

According to another aspect of the present invention, a seating assembly for a vehicle includes a vehicular central longitudinal axis. A front seat and a rear seat each define a central longitudinal axis. The front and rear seats are substantially arranged on opposite sides of the vehicular central longitudinal axis in a staggered relationship. The front seat central longitudinal axis is arranged at a different angle relative to the vehicular central longitudinal axis than the rear seat central longitudinal axis.

According to yet another aspect of the present invention, a seating assembly for a vehicle includes a vehicular central longitudinal axis. A front seat and a rear seat each define a central longitudinal axis. The front and rear seats are substantially arranged on opposite sides of the vehicular central longitudinal axis in a staggered relationship. The central longitudinal axis of the front seat is arranged at a different angle relative to the vehicular central longitudinal axis than the central longitudinal axis of the rear seat. The distance of the central longitudinal axes of both seats when measured at a rear edge of the respective seat from the vehicular central longitudinal axis is less than half the width of the respective seat.

It is a first object of the invention to provide a staggered seating arrangement to facilitate the production of a motor vehicle having small overall dimensions.

According to a first aspect of the invention there is provided a seating arrangement for a passenger vehicle having a central longitudinal axis, the seating arrangement including a front seat for a driver and a rear seat for a passenger having respective central longitudinal axes arranged on opposite sides of the central longitudinal axis in a staggered relationship, wherein the central longitudinal axis of the front seat is arranged at a different angle with respect to the central longitudinal axis of the vehicle than the central longitudinal axis of the rear seat and at least one of the seats is positioned such that the central longitudinal axis of the respective seat measured at a rear edge of the seat is mounted closer to the central longitudinal axis of the passenger vehicle than is possible with a symmetrical side-by-side seating arrangement.

The at least one seat may be positioned such that a distance measured from the central longitudinal axis of the respective seat at a rear edge of the seat to the central longitudinal axis of the passenger vehicle is less than half the width of the respective seat.

The distance of the central longitudinal axes of both seats when measured at a rear edge of the respective seat from the central longitudinal axis of the passenger vehicle may be less than half the width of the respective seat.

The central longitudinal axis of the front seat may be arranged parallel to the central longitudinal axis of the vehicle and the rear seat may be turned outwardly so that the central longitudinal axis of the rear seat is arranged at a small outwardly turned angle with respect to the central longitudinal axis of the vehicle.

The front seat may be turned inwardly so that the central longitudinal axis of the front seat is arranged at a small inwardly turned angle with respect to the central longitudinal axis of the vehicle and the rear seat may be turned outwardly so that the central longitudinal axis of the rear seat is arranged at a small outwardly turned angle with respect to the central longitudinal axis of the vehicle.

The front seat may be turned inwardly so that the central longitudinal axis of the front seat is arranged at a small inwardly turned angle with respect to the central longitudinal axis of the vehicle and the central longitudinal axis of the rear seat may be arranged parallel with respect to the central longitudinal axis of the vehicle.

The central longitudinal axis of the rear seat may intersect one of the central longitudinal axis of the vehicle and an extension of the central longitudinal axis of the vehicle at a position to the rear of the rear seat.

The central longitudinal axis of the front seat may intersect one of the central longitudinal axis of the vehicle and an extension of the central longitudinal axis of the vehicle at a position in front of the front seat.

At least the front seat may be mounted high so as to have an H-point height measured with respect to a heel contact point in a range of 0.375 m to 0.495 m.

According to a second aspect of the invention there is provided a compact passenger vehicle having a source of motive power and a seating arrangement constructed in accordance with said first aspect of the invention.

These and other aspects, objects, and features of the present invention will be understood and appreciated by those skilled in the art upon studying the following specification, claims, and appended drawings.

BRIEF DESCRIPTION OF THE DRAWINGS

The invention will now be described by way of example with reference to the accompanying drawing of which.

DETAILED DESCRIPTION OF THE EMBODIMENTS

Figure 1:
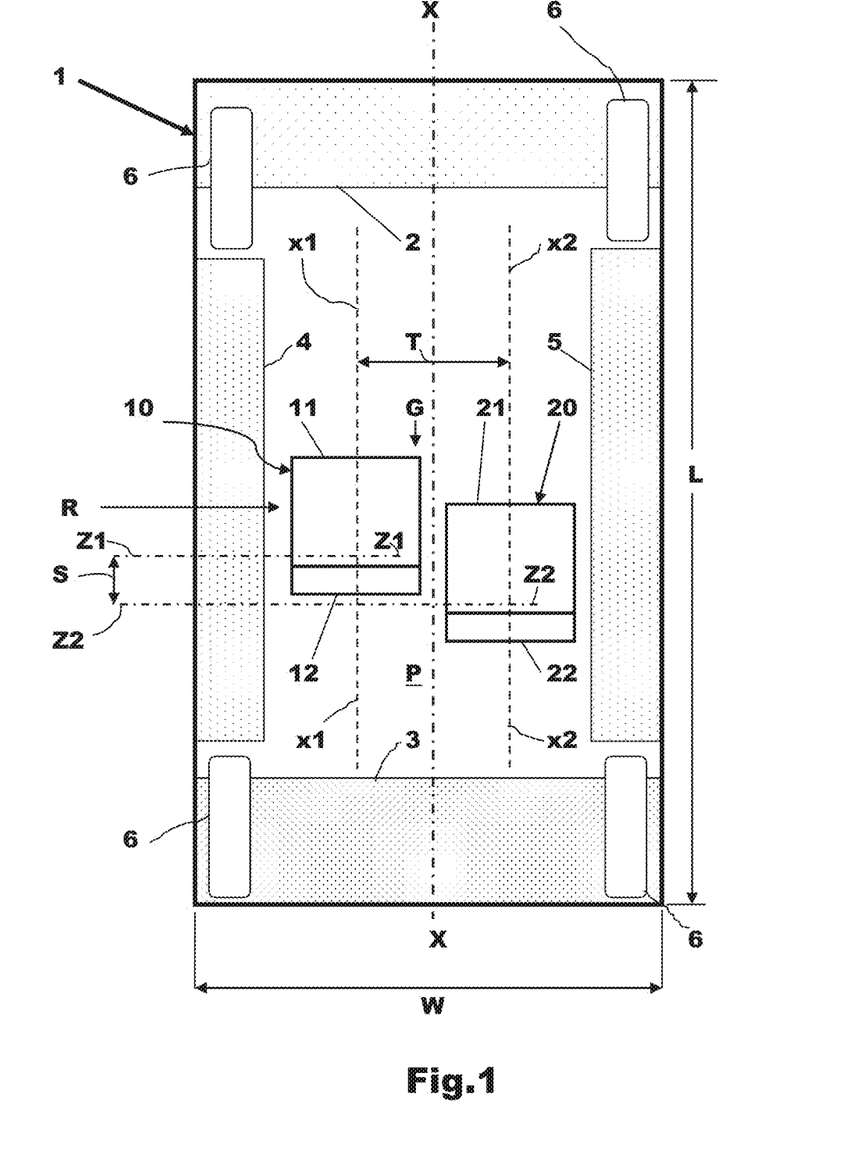
FIG. 1 is a schematic plan view of a motor vehicle having a staggered seating arrangement.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
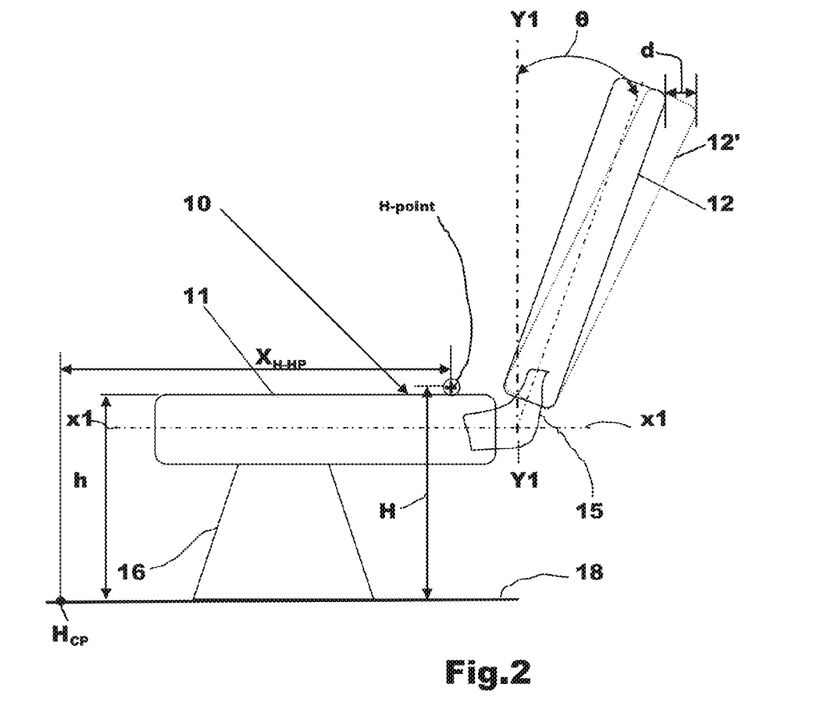
FIG. 2 is a schematic side view on an enlarged scale in the direction of arrow 'R' on FIG. 1 of a front one of the two seats shown in FIG. 1.
Figure 3:
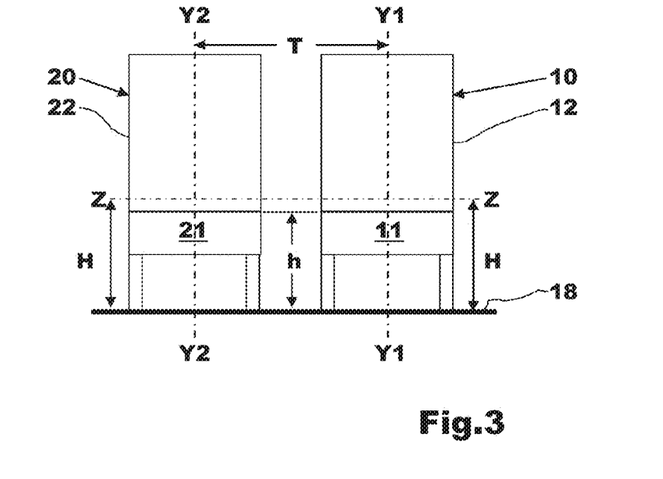
FIG. 3 is a schematic front view in the direction of arrow 'G' on FIG. 1 of the two seats forming the seating arrangement.

With particular reference to FIGS. 1-3 there is shown a first embodiment of a seating arrangement for a passenger vehicle in the form of a car 1. The seating arrangement is located in a passenger compartment 'P' of the vehicle 1.

The motor vehicle 1 includes a body structure having a front crush zone 2, two side crush zones 4, 5, a rear 3 crush zone and has four wheels 6 connected to the body structure via a conventional suspension system. The vehicle 1 has a central longitudinal axis X-X that extends from a front end of the vehicle 1 to a rear end of the vehicle 1.

It will be appreciated that the vehicle 1 could be powered by any known source of motive power including, but not limited to, a combustion engine, an electric motor or a combination of same. The source of motive power can be mounted at any convenient location and can drive the vehicle 1 by any suitable form of transmission. It will also be appreciated that the motor vehicle could have three wheels or more than four wheels.

The seating arrangement includes a front seat 10 and a rear seat 20 arranged in a staggered relationship to one another. Thus, the front and rear seats 10 and 20 are offset in a longitudinal direction a stagger distance S.

The stagger distance S is measured between two transverse hip pivot axes Z1-Z1 and Z2-Z2 each of which extends through an H-point for the respective seat 10, 20. The H-point is an important characteristic for all vehicle seat design and is the point that corresponds to the pivot axis of the hips of an occupant of the seat.

The H-point of each seat 11, 20 is defined in terms of a vertical distance H (Y axis) and a horizontal longitudinal distance $X_{H\text{-}HP}$ (X axis) measured from a known reference point referred to as the heel contact point $H_{CP}$ (the heel contact point $H_{CP}$ for the front seat 10 is shown in FIG. 2). The heel contact point $H_{CP}$ is the position where a heel of a person sat in the seat 10, 20 is located. As the heel of an occupant is resting on a floor 18 of the vehicle 1, the height H is effectively the vertical height of the H-point above the floor 18 assuming the floor 18 is flat and the heel contact point $H_{CP}$ is the position of contact of a heel of a $95^{th}$ percentile male occupant with the floor. The heel contact point $H_{CP}$ represents a reference point from which the vertical and horizontal longitudinal positions of the H-point are measured.

The front seat 10 is mounted in the vehicle 1 forward relative to the rear seat 20 by an amount equal to the stagger distance S. Thus, the front seat 10 is mounted closer to the front end of the vehicle 1 than the rear seat 20. In this case the front seat 10 is a seat for a driver of the vehicle 1 and the rear seat 20 is a seat for a passenger of the vehicle 1. A stagger distance S of 0.3 to 0.35 m has been shown to provide a good compromise between vehicle compactness and comfort for the occupants. The longitudinal stagger distance S can conveniently be measured between the H-point for a $95^{th}$ percentile male front occupant and the H-point for a $95^{th}$ percentile male rear occupant.

The front seat 10 has a seat squab 11 and a backrest 12 arranged at an obtuse angle with respect to the seat squab 11. The seat squab 11 is attached to the floor 18 of the vehicle 1 by means of a seat mounting structure 16. The seat mounting structure 16 is used to mount the respective seat squab 11 on the floor 18 of the vehicle 1 and may provide the ability to adjust the seat 10 at least in a longitudinal direction of the vehicle 1 so as to suit occupants of differing stature.

The backrest 12 is positioned upright, thus, it is inclined relative to vertical by a relatively small inclination angle θ. The term upright backrest means a backrest having an inclination relative to vertical less than about 23 degrees.

The inclination angle θ is measured relative to a vertical axis Y1-Y2 which is a vertical axis of the vehicle 1 and, in the example shown in FIG. 2, is shown passing through a point corresponding to a transverse pivot axis of the backrest 12.

The rear seat 20 has, like the front seat 10, a seat squab 21 and a backrest 22 arranged at an obtuse angle with respect to the seat squab 11. The seat squab 21 is attached to the floor 18 of the vehicle 1 by means of a seat mounting structure which may provide at least longitudinal adjustment for the seat 20.

The backrest 22 is in this case also positioned upright, thus, it is inclined relative to vertical by a relatively small inclination angle.

Because both of the seat squabs 11, 21 are mounted the same distance h from the floor 18 and the floor 18 is flat both of the hip pivot axes Z1-Z1 and Z2-Z2 fall on a common plane indicated on FIG. 3 by the line Z-Z.

It will be appreciated that the actual height h of the seat squab 11 is different to the height of the H-point but there is a relationship between the undeflected seat squab height h and H-point height H. Typically, the H-point height H for a seat is approximately 0.095 m greater than the undeflected seat squab height h.

It is desirable if at least the front seat squab 11 is high mounted. The term 'H point height' as meant herein is the height from a heel contact point $H_{CP}$ to the location of the H-point. Whether a seat is 'high mounted' depends upon the vertical height H between the respective heel contact point $H_{CP}$ and the respective H-point and not the height of the respective seat squab above the floor upon which the seat is mounted or the height of the seat squab above the road.

By mounting a seat high, the longitudinal distance $X_{H-HP}$ between a heel contact point $H_{CP}$ and the respective H-point is reduced. This because a high mounted seat squab results in the lower leg portions (tibia and fibula) of an occupant naturally being more vertically positioned thereby reducing the horizontal distance $X_{H-HP}$. This has the effect of allowing a reduction in the distance that needs to be provided between the front seat 10 and a forward end of the passenger compartment P. Thus, the passenger compartment P can be made shorter.

If both of the seat squabs 11, 21 are mounted higher than would normally be the case for a passenger vehicle, thus, the H-point heights H for the two seats are greater than that normally used for a passenger vehicle, both of the occupants will have better forward visibility due to their higher seating position relative to the floor of the vehicle. This is particularly advantageous in city or urban motoring where advance warning of a pedestrian in the road greatly improves safety.

It is normal for passenger vehicle use to mount the seats such that an H-point height is less than about 0.35 m and typically the H-point height for a passenger vehicle will be about 0.3 m.

Furthermore, by using two high mounted seat squabs 11, 21 an upright backrest position can be used for both seats 10, 20 without causing discomfort to the users of the seats 10, 20. This is because, when sitting on a high mounted seat squab, the upper leg portions (femurs) of an occupant tend to be more horizontally disposed than is the case with a low mounted seat squab which permits a more upright backrest to be used without reducing the angle between the upper leg portions (femurs) of the occupant and the spine of the occupant to an unacceptable amount.

The use of an upright backrest 12 for at least the front seat 10 has the advantage that the occupant of the rear seat 20 does not feel so impacted upon by the close presence of the backrest 11 of the front seat 10. Compare the upright backrest 12 shown on FIG. 2 with the normally inclined backrest 12' (shown in dotted outline). As can be seen with reference to FIG. 2, the back of the upright backrest 12 is a distance 'd.' further from an occupant of the rear seat 20 than would be the case with a normally inclined backrest as indicated by the backrest 12'. A normally inclined backrest is one that is inclined more than 23 degrees.

By using a small backrest inclination angle θ for both seats 10, 20, ingress and egress from the vehicle 1 can be improved for certain vehicle designs.

For example, if a door aperture of such a vehicle partly covers the rear mounted passenger seat 20, it is difficult for the passenger to exit the vehicle. To leave the vehicle 1 the passenger will need to lean their body forward to pass through the door aperture. On seats with a high backrest inclination angle θ, the forward body leaning may need a significant body forward movement during which there is a risk that the passenger will impact against the backrest 12 of the front seat 10. To avoid this, the longitudinal distance between the front and rear seats 10 and 20 needs to be greater than if an upright backrest having a small backrest inclination angle θ is used. This is because with an upright backrest 22 the passenger already has quite a vertical body position and so does not need to move forward so much.

It will however be appreciated that the backrests 12, 22 could be inclined by differing amounts and in such a case the rear seat backrest 22 should be more inclined than the front seat backrest 12 as this provides additional rear passenger space. In such a case both of the backrests 12, 22 could be upright or the front seat backrest 12 is upright with the rear seat backrest 22 being inclined so that it is not upright thus, it is inclined more than 23 degrees.

By mounting both seat squabs 11, 21 at a height h that provides a heel to floor contact point $H_{CP}$ to H-point height H in a general range of 0.375 m to 0.495 m but may be in a range of 0.4 to 0.45 m a good result can be achieved. The equivalent undeflected seat squab heights are 0.28 to 0.4 m for the general range and 0.305 to 0.355 m for the desired range.

Although it would possible to mount the seat with an H-point higher than the upper limit of the general range, there are several disadvantages with a seat mounted so as to provide an H-point greater than the upper limit of the above range. Firstly, moving an occupant higher raises their center of gravity with a negative effect on the transverse stability of the vehicle during cornering and also occupants of below average height may find it difficult to sit comfortably because the seat squab is mounted too high. If the seat is mounted lower than the lower limit of the above range then an upright backrest cannot be comfortably used unless the lower legs portions are extended forwardly thereby greatly increasing the heel to H-point horizontal distance.

To provide a comfortable seating position for a $50^{th}$ percentile male occupant, the mounting of a seat squab at a height h that provides a heel contact point $H_{CP}$ (floor) to H-point height H in the desired range of 0.4 m to 0.45 m has been found to produce a particularly good result.

Therefore, by using an H-point height H within the above ranges an upright backrest can be used while maintaining comfort for an occupant of the seat.

In the example shown in FIG. 1 which is provided to aid understanding of the invention, each of the seats 10, 20 has a respective central longitudinal axis x1-x1, x2-x2 arranged parallel to the central longitudinal axis X-X of the vehicle 1. However, in accordance with this invention at least one of the seats 10, 20 is not disposed parallel with respect to the central longitudinal axis X-X.

The central longitudinal axes x1-x1, x2-x2 pass through respective mid-points of the seat squabs 11, 21 at a rear edge of the respective seat squab 11, 21 so that half of the width of the respective seat squab 11, 21 lies on each side of the respective mid-point. In order to minimize vehicle width W, a transverse distance or spacing T between the central longitudinal axes x1-x1; x2-x2 of the two seats 10, 20 needs to be kept small.

Although in FIGS. 1 and 3 the two seats 10, 20 are shown spaced apart so that there is no overlap between the seats 10, 20, in practice there will be some overlap between the two seats 10, 20. The seat squab 21 of the rear seat 20 is shaped so as to avoid contact with the seat squab 11 of the front seat 10. Therefore, at least one of the seats 10, 20 is positioned such that its central longitudinal axis x1-x1; x2-x2 as measured at a rear edge of the respective seat 10, 20 is mounted closer to the central longitudinal axis X-X of the passenger vehicle 1 than would be possible with a symmetrical side-by-side seating arrangement. This is achieved by mounting the respective seat 10, 20 a distance, measured from the central longitudinal axis of the respective seat x1-x1; x2-x2 at a rear edge of the respective seat 10, 20 to the central longitudinal axis X-X of the passenger vehicle 1, that is less than half the width of the respective seat 10, 20. For example, if the width of the respective seat 10, 20 is 0.44 m, then the distance from the central longitudinal axis of the respective seat 10, 20 to the central longitudinal axis X-X of the passenger vehicle 1 would be less than 0.22 m.

The width of a seat 10, 20 in this case is the width of the respective seat squab 11, 21 and the rear edge of a seat 10, 20 is the rear edge of the respective seat squab 11, 21. In some embodiments both seats 10, 20 have their respective central longitudinal axes x1-x1; x2-x2 at a rear edge of each seat positioned from the central longitudinal axis X-X of the passenger vehicle 1 a distance that is less than half the width of the respective seat. For example, if the width of both seats 10, 20 is 0.44 m, the distance from the central longitudinal axis of each seat 10, 20 at a rear edge of the respective seat 10, 20 to the central longitudinal axis X-X of the passenger vehicle 1 would be less than 0.22 m.

Figure 4:
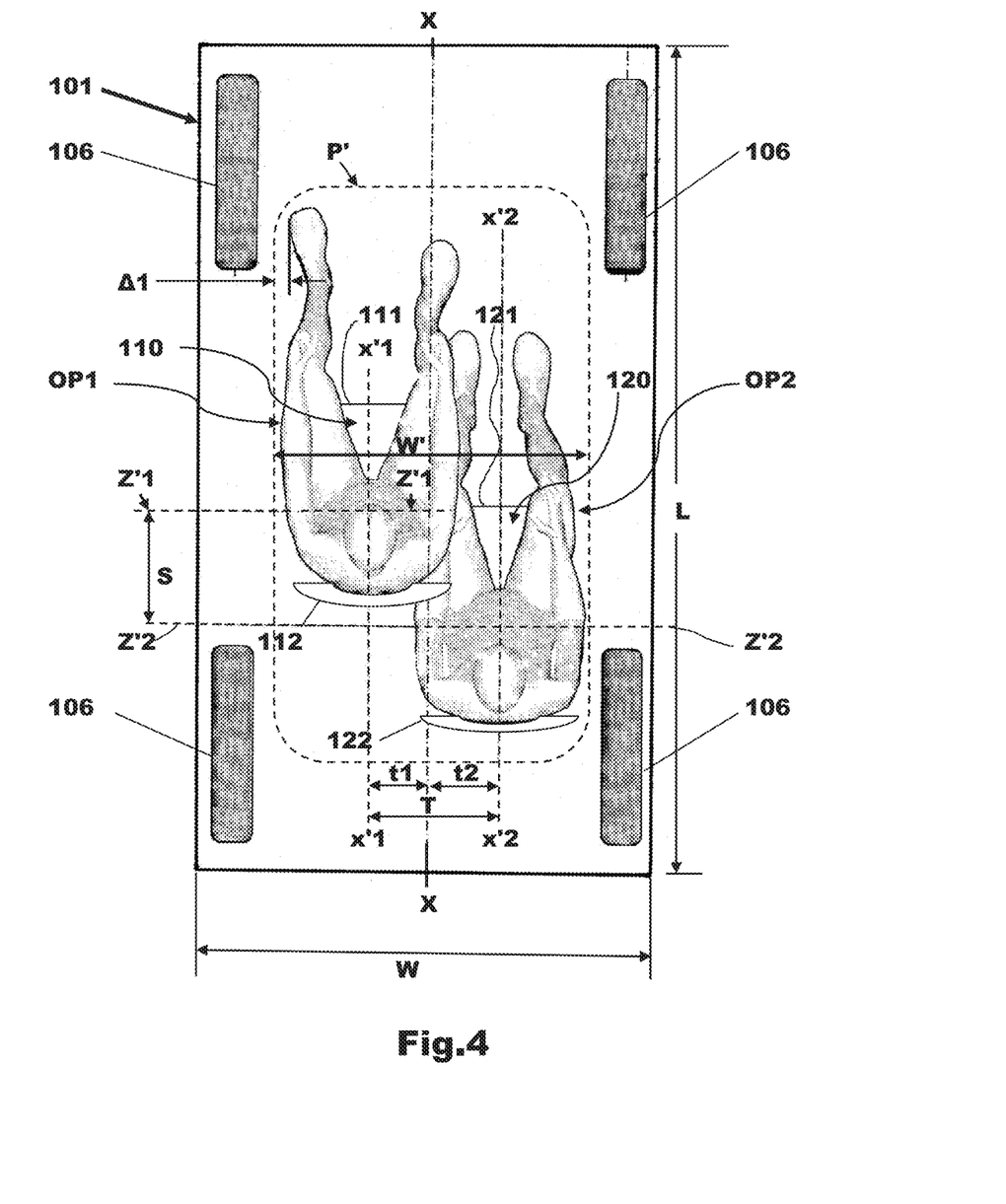
FIG. 4 is a top plan view of a motor vehicle showing a staggered seating arrangement with two occupants in seated positions.
Figure 5:
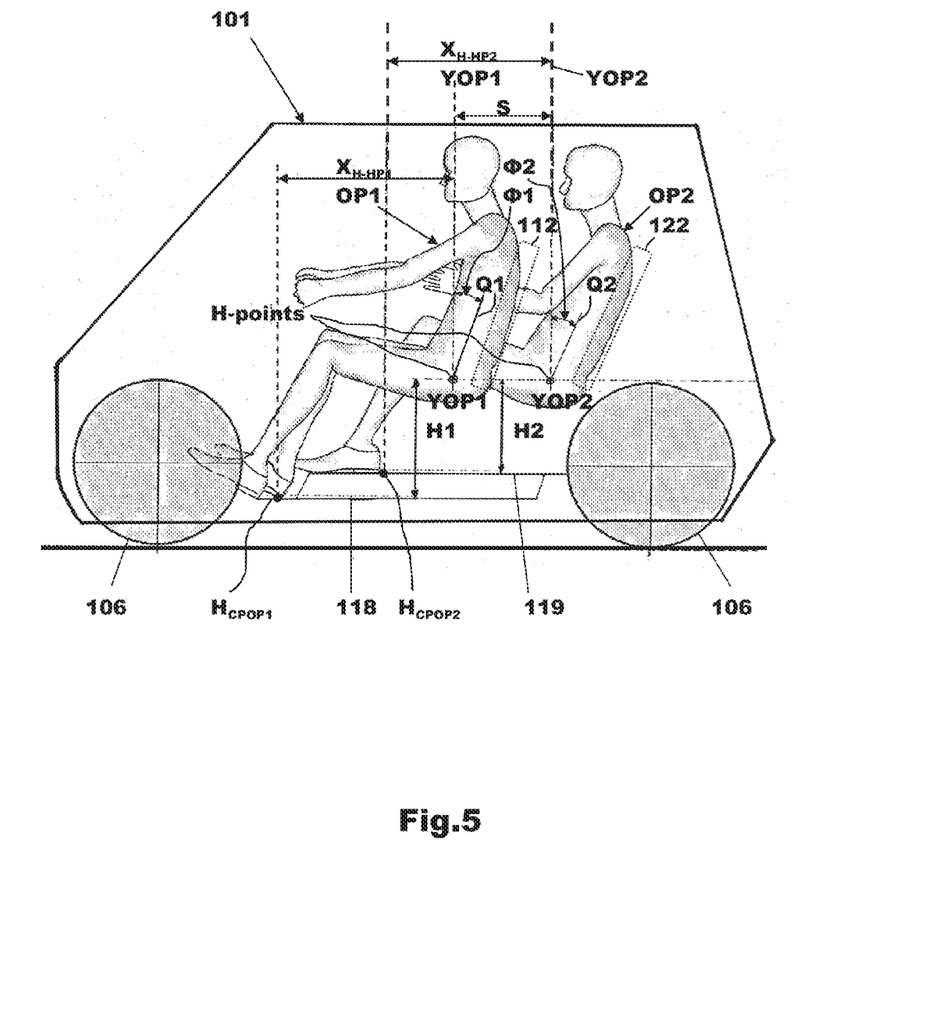
FIG. 5 is a side plan view of the seating arrangement shown in FIG. 4 in which the seat squabs are omitted for clarity.
Figure 6:
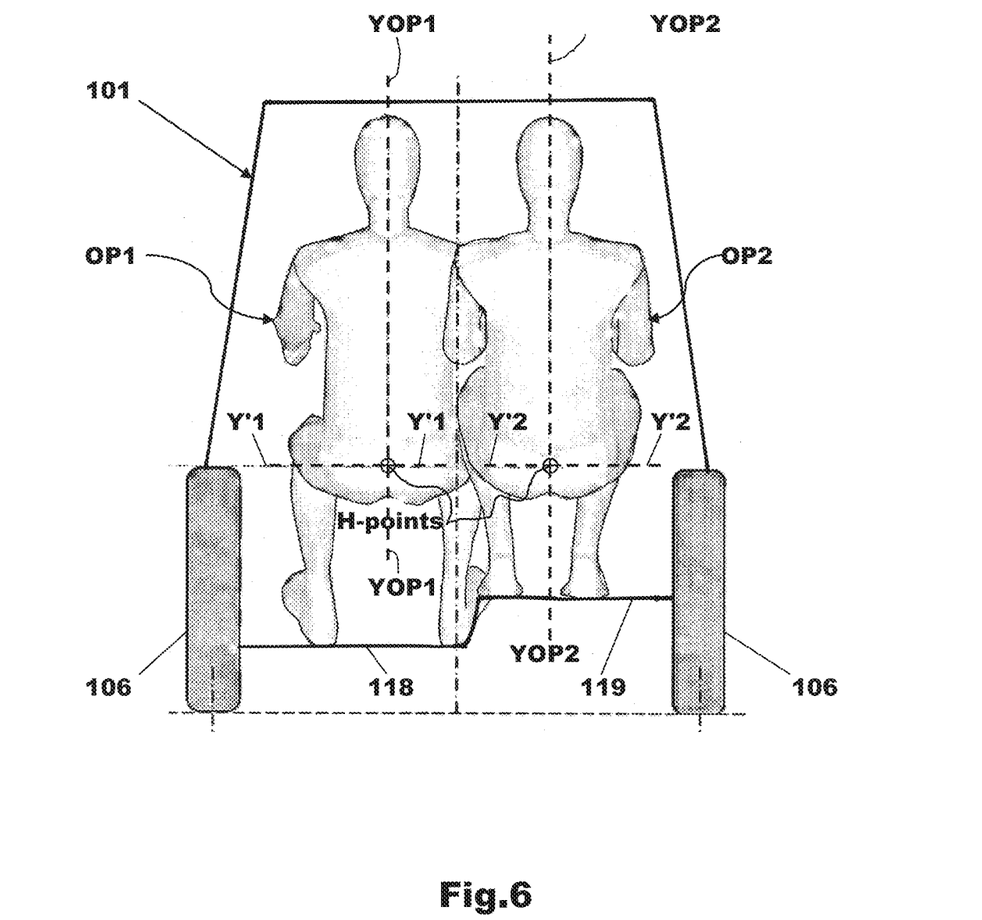
FIG. 6 is a rear plan view of the occupants shown in FIGS. 4 and 5 with the seats omitted for clarity.

FIGS. 4-6 show a seating arrangement for accommodating two occupants OP1, OP2 in a staggered relationship within a passenger compartment P' of a powered passenger vehicle 101.

FIGS. 4-6 illustrate one embodiment of the invention and each of the seats 110, 120 having a respective central longitudinal axis x'1-x'1, x'2-x'2 shown arranged parallel to the central longitudinal axis X-X of the vehicle 101. However, in accordance with this invention at least one of the seats 110, 120 is not disposed parallel with respect to the central longitudinal axis X-X.

As before the central longitudinal axes x'1-x'1, x'2-x'2 pass through respective mid-points of the seat squabs 111, 121 at a rear edge of the respective seat squab 111, 121 so that half of the width of the respective seat squab 111, 121 lies on each side of the respective mid-point.

The vehicle 101 has a body structure defining front, rear and crush zones so as to comply with current crash standards and four road wheels 106. The vehicle has a longitudinal length L and a transverse or lateral width W. The passenger compartment P' is of width W' and has the seating arrangement located therein.

The vehicle 101 has a central longitudinal axis X-X that extends from a front end of the vehicle 101 to a rear end of the vehicle 101. As before, the vehicle 101 can be powered by any known source of motive power including, but not limited to a combustion engine, an electric motor or a combination of same. The source of motive power can be mounted at the front of the vehicle 101 or at the rear of the motor vehicle 101 and can drive the vehicle 101 by any suitable form of transmission. A conventional suspension system is used to connect the four wheels 106 to the body structure of the vehicle 101.

The front and rear seats 110, 120 are arranged in a staggered relationship to one another. Thus, the front and rear seats 110 and 120 are offset in a longitudinal direction of the vehicle 101 by a longitudinal seat stagger distance S measured between two transverse hip pivot axes Z'1-Z'1 and Z'2-Z'2 each of which extends through an H-point for the respective seat 110, 120.

As before, a stagger distance S of between 0.3 m and 0.35 m has been shown to provide a good compromise between vehicle compactness and comfort for the occupants and, in the example shown, the seat stagger distance S is 0.35 m.

The longitudinal stagger distance S can conveniently be measured between the H-point for a $95^{th}$ percentile male front occupant and the H-point for a $95^{th}$ percentile male rear occupant.

The front seat 110 is mounted in the vehicle forward relative to the rear seat 120 by an amount equal to the longitudinal stagger distance S. Thus, the front seat 110 is mounted closer to the front end of the vehicle 101 than the rear seat 120. In this case the front seat 110 is a seat for a driver OP1 of the vehicle 101 and the rear seat 120 is a seat for a passenger OP2 of the vehicle 101.

The front seat 110 has a seat cushion or squab 111 and a backrest 112 (shown in dotted outline on FIG. 5) arranged at an obtuse angle with respect to the seat squab 111 and the seat squab 111 attached to a floor 118 of the vehicle 101 by means of a seat mounting structure. The seat mounting structure mounts the respective seat squab 111 in a high position on the floor 118 of the vehicle 101 and may provide the ability to adjust the seat 110 at least in a longitudinal direction of the vehicle 101 so as to suit occupants of differing height.

One advantage of the use of a high mounted front seat 110 is that, if the seat 110 is fitted with a fore-aft position adjuster so as to permit the seat 110 to be moveable in a longitudinal direction of the passenger vehicle 101, the H-point height H1 of the seat 110 can remain substantially constant irrespective of the longitudinal position of the seat 110 within the passenger compartment P' of the passenger vehicle 101. Thus, there is no need to provide a seat height adjuster for the seat 110 thereby saving cost. However, if a fore-aft adjustment is provided for the front seat 110, a mechanism should be provided to prevent users of the passenger vehicle 1 from reducing the stagger distance S below a lower limit such as for example 0.3 m. In the situation where the front seat 110 can move in a fore-aft direction this can be achieved by restricting the rearward travel of the front seat 110 to a position where the minimum stagger distance S is not compromised.

As before a high mounted seat is one having a seat squab that positions the respective H-point for the seat within a predefined vertical height range such that the H-point height is greater than 0.375 m and the H-point of the seat 110 is the position of the respective hip pivot axis Z'1-Z'1 defined in terms of a vertical distance H1 (Y axis) measured from a known reference point $H_{CPOP1}$ and a horizontal distance $X_{H-HP1}$ (X axis) measured from the same reference point $H_{CPOP1}$. The reference point $H_{CPOP1}$ is the position of contact of a heel of the occupant OP1 with the underlying floor 118. Because the heel of the occupant OP1 is resting on the flat floor 118 of the vehicle 101 the height H1 is effectively the vertical height of the H-point above the floor 118.

It will be appreciated that the actual height of the seat squab 111 is different to the H-point height H1 of the respective H-point but there is a fixed relationship between seat squab height and H-point height H1. Thus, if the height of the seat squab 111 is increased, then the respective H-point height H1 will also increase by the same amount. Typically, the H-point height H for a seat is approximately 0.095 m greater than the seat squab height h.

By mounting the seat squab 111 at a height h that provides a floor to H-point height H in a general range of 0.375 m to 0.495 m but may be in a range of 0.4 to 0.45 m a good result can be achieved. The equivalent undeflected seat squab heights are 0.28 to 0.4 m for the general range and 0.305 to 0.355 m for the desired range.

The use of a high mounted seat squab 111 permits the backrest 112 of the front seat 110 to be positioned upright, thus, the backrest 112 is inclined relative to vertical by a relatively small inclination angle Φ1. As before, the term upright backrest means a backrest having an inclination relative to vertical less than 23 degrees and in this case the backrest inclination angle Φ1 is set to 19 degrees.

In the example shown, the backrest inclination angle Φ1 is measured relative to a vertical axis YOP1-YOP1 which is a vertical axis of the vehicle 101 that extends vertically up from the H-point of the front seat 110. The backrest inclination angle Φ1 is shown measured between the vertical axis YOP1-YOP1 and a plane Q1 that is arranged parallel to the respective backrest 112.

The rear seat 120 has a seat squab 121 and a backrest 122 (shown in dotted outline on FIG. 5) arranged at an obtuse angle with respect to the seat squab 121 and the seat squab 121 is attached to a floor 119 of the vehicle 101 by means of a seat mounting structure.

The seat mounting structure mounts the respective seat squab 121 in a low or normal position on the floor 119 of the vehicle 101 and may provide the ability to adjust the seat 110 at least in a longitudinal direction of the vehicle 101 so as to suit occupants of differing height in which case a mechanism is may be used to prevent the minimum value of stagger distance S from being compromised. Thus, a minimum stagger distance of 0.3 m should be maintained at all times. A low mounted seat is one having a seat squab that positions the respective H-point for the seat below a predefined vertical height range.

As before, the H-point of the seat 120 is the position of the respective hip pivot axis Z'2-Z'2 defined in terms of a vertical distance H2 (Y axis) measured from a known reference point $H_{CPOP2}$ and a horizontal distance $X_{H-HP2}$ (X axis) measured from the same reference point $H_{CPOP2}$. The reference point in this case is the position of contact $H_{CPOP2}$ of a heel of the occupant OP2 with the underlying floor 119. Because the heel of the occupant OP2 is resting on the flat floor 119 of the vehicle 101 the height H2 is effectively the vertical height of the H-point above the floor 119.

It will be appreciated that the actual height of the seat squab 121 is different to the H-point height H2 of the respective H-point but there is a fixed relationship between seat squab height and H-point height H1. Thus, if the height of the seat squab 121 is increased, then the respective H-point height H2 will also increase by the same amount. Typically, the H-point height H for a seat is approximately 0.095 m greater than the seat squab height h.

The backrest 122 is not positioned upright, thus, the backrest 122 is inclined relative to vertical by an inclination angle Φ2 that is above the range defined as being upright and, in the example shown, the backrest 122 is inclined at an inclination angle Φ2 of 25 degrees.

The backrest inclination angle Φ2 is measured relative to a vertical axis YOP2-YOP2 which is a vertical axis of the vehicle 101 that extends vertically up from the H-point of the rear seat 120. The backrest inclination angle Φ2 is shown measured between the vertical axis YOP2-YOP2 and a plane Q2 that is arranged parallel to the respective backrest 122.

Each of the hip pivot axes Z'1-Z'1 and Z'2-Z'2 passes through the H-point for the respective seat 110, 120 and falls on a common horizontal plane even though the respective H-point heights H1 and H2 for the two seats 110, 120 are different, one corresponding to the high mounted seat squab 111 and one to the low mounted seat squab 121. This is due to the fact that the floor of the vehicle 101 is not flat it is stepped as best understood with reference to FIG. 6. The floor 118 on the side of the vehicle 101 where the front seat 110 is mounted is lower than the floor 119 on which the rear seat 120 is mounted.

Depending upon the height of the step between the two floors 118, 119 and the magnitudes of the respective H-point heights H1 and H2 of the two seats 110, 120, the two H-points will either fall on a common plane as shown or be vertically displaced. It is desirable if the two H-point heights H1, H2 do fall on the same horizontal plane because the two occupants OP1, OP2 will then sit at approximately the same height.

In the case of the rear seat 120 it is possible to use an H-point height H2 that is below that defined as being high mounted because the rear seat 120 is mounted further away from the front of the passenger compartment. It is therefore not so critical to reduce the longitudinal distance $X_{H-HP2}$ between the heel contact point $H_{CPOP2}$ and the H-point for the rear seat 120 in order to produce a short vehicle. Whether the rear seat 120 needs to be high mounted will depend upon whether an upright backrest 122 is used to avoid contact with a rear wall of the passenger compartment P'.

If an upright backrest 122 is used for the rear seat 120, then the rear seat 120 is mounted high to allow the comfortable use of a small backrest inclination angle Φ2 and in such a case the floor of the motor vehicle 101 will likely be totally flat with no step.

By using a high mounted seat squab 111 an upright position for the backrest 112 can be used without causing discomfort to an occupant OP1 of the seat 110. The use of an upright backrest 112 for the front seat 110 has the advantage that the occupant OP2 of the rear seat 120 does not feel so impacted upon by the close presence of the backrest 111 of the front seat 110. This feeling of space can be further improved if there is sufficient room in the passenger compartment P' by positioning the backrest 122 of the rear seat 120 in a more inclined position than the backrest 112 of the front seat 110. For example, by using an upright front seat backrest 112 with an inclination angle Φ1 of 19 degrees and a less upright rear seat backrest 122 with an inclination angle Φ2 of 25 degrees the rear seated passenger OP2 will feel less claustrophobic and has more space.

As before, a transverse distance or spacing T between the central longitudinal axes x'1-x'1 and x'2-x'2 of the two seats 110, 120 respectively needs to be kept small in order to minimize vehicle width W. As shown on FIG. 4 each of the central longitudinal axes x'1-x'1, x'2-x'2 of the seats 110, 120 is offset from the central axis X-X of the vehicle 101 by a distance t1, t2 respectively. The two offsets t1, t2 forming in combination the transverse spacing T between the central longitudinal axes x'1-x'1, x'2-x'2 of the two seats 110, 120. The offsets t1, t2 are measured at a rear edge of the respective seat 110, 120.

In the example shown in FIG. 4, the offset t2 is greater than the offset t1 but this need not be the case and the offsets t1, t2 could be identical or the offset t1 could be more than the offset t2.

However, in all cases, at least one of the seats 110, 120 is positioned such that the central longitudinal axis x'1-x'1; x'2-x'2 of the respective seat 110, 120 measured at a rear edge of the respective seat 110, 120 is mounted closer to the central longitudinal axis X-X of the passenger vehicle 101 than would be possible with a symmetrical side-by-side seating arrangement. This is achieved by mounting the respective seat 110, 120 an offset distance t1 or t2, measured from the central longitudinal axis x'1-x'1; x'2-x'2 at a rear edge of the respective seat 110, 120 to the central longitudinal axis X-X of the passenger vehicle 101, that is less than half the width of the respective seat 110, 120.

In a case where a respective seat 110, 120 has a width of 0.44 m then, the central longitudinal axis of the respective seat 110, 120 is offset from the central axis X-X no more than 0.22 m Although such an arrangement provides a compact motor vehicle, the inventors have realized that reducing the width of the passenger compartment P' may in some cases be restricted by the need to provide sufficient space in a foot well area of the passenger compartment P' in order to meet regulatory standards. For example, in the regulation ECE 35, Annex 4 the minimum distance from the brake pedal outboard edge to the vehicle trim is 0.13 m and the minimum distance from the same edge of the brake pedal to the inboard edge of the accelerator pedal is 0.05 m. It follows there needs to be a minimum of 0.08 m from the inboard edge of the accelerator pedal to the trim.

It is a particular problem in the case of a right hand drive vehicle where a prescribed distance has to be kept between the foot of a driver placed on an accelerator pedal and the adjacent outer wall of the foot well area. This gap is indicated on FIG. 4 as $\Delta 1$ and is the distance between an outer edge of a foot of the driver OP1 and the adjacent wall of the passenger compartment P'.

Figure 7:
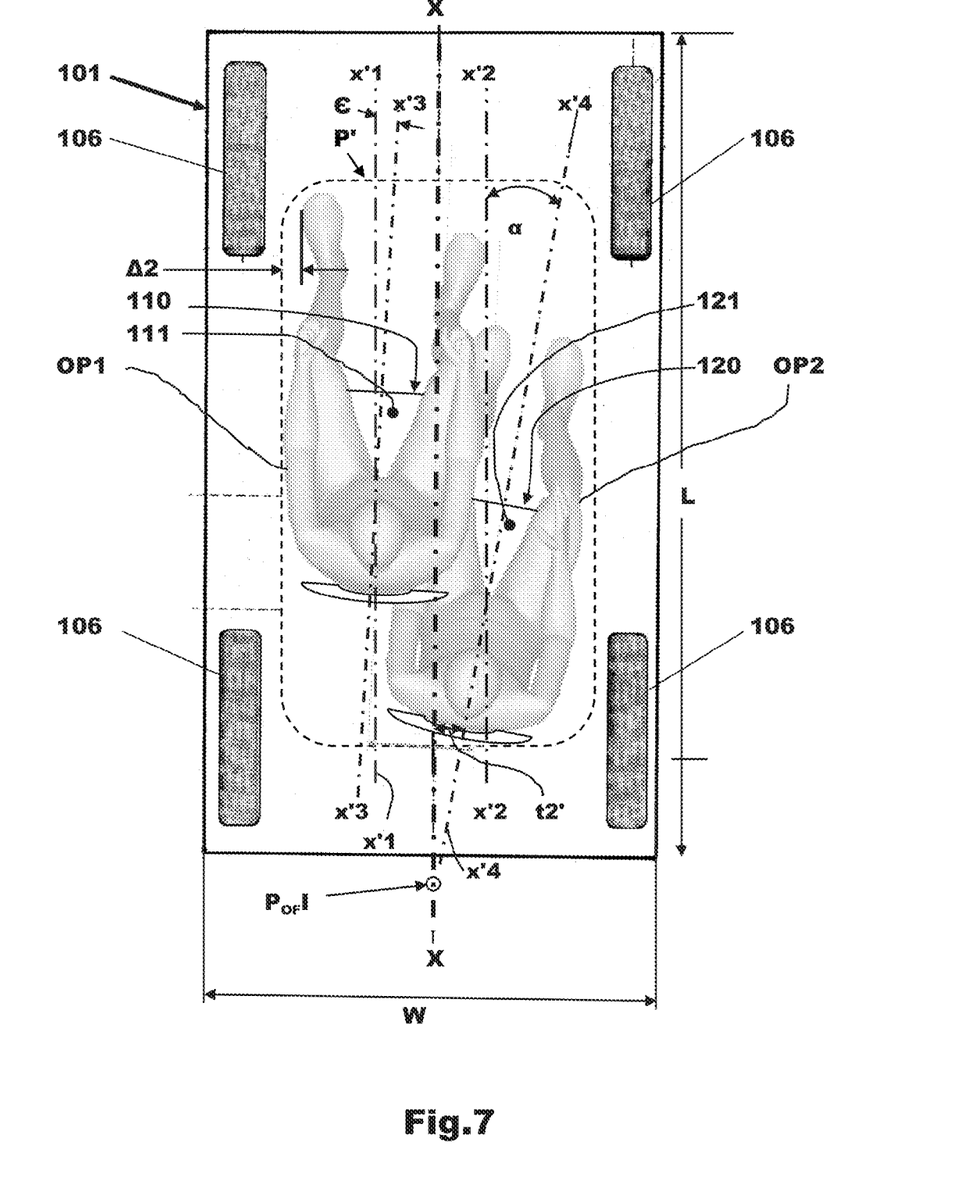
FIG. 7 is a top plan view similar to FIG. 4 showing a motor vehicle according to a second aspect of the invention including a first embodiment of a seating arrangement according to a first aspect of the invention.

Referring now to FIG. 7 there is shown a first embodiment of a seating arrangement according to the invention.

This embodiment is in most respects identical to that previously described with reference to FIGS. 4-6 with the exception that neither of the seats is aligned parallel to the longitudinal axis X-X of the motor vehicle 101. The same reference numerals are used for like parts.

The motor vehicle 101 can have a flat floor or a stepped floor as shown in FIGS. 4-6.

The orientation of the front seat 110 used to seat the driver OP1 is not disposed parallel to the central longitudinal axis X-X of the motor vehicle 101 and the rear seat 120 used to seat a passenger OP2 next to a driver OP1 is not disposed parallel to the central longitudinal axis X-X of the motor vehicle 101.

The position of the central longitudinal axis x'1-x'l of the front seat 110 is shown for reference purposes in the same position as shown in FIGS. 4-6 and is arranged as before parallel to the central longitudinal axis X-X of the vehicle 101.

However, a central longitudinal axis x'3-x'3 of the front seat 110 is not arranged parallel to the central longitudinal axis X-X of the vehicle 101 it is rotated inwardly a small inward angle ε in the range of 0.1 to 7 degrees and may be in the range 0.1 to 3 degrees with respect to the original parallel central longitudinal axis x'1-x'1 of the front seat 110.

The central longitudinal axis x'3-x'3 passes through a midpoint of the seat squab 111 at a rear edge of the seat squab 111 so that half of the width of the seat squab 111 lies on each side of the mid-point.

The effect of this inward rotation or inward turning of the front seat 110 is to rotate the central longitudinal axis of the front seat 110 about a vertical axis and consequentially move the feet of the driver OP1 inwards and away from an outer wall of the passenger compartment P'. Therefore in this case the gap $\Delta 2$ between an outer edge of a foot of the driver OP1 and the adjacent wall of the passenger compartment P' is larger than is the case with the parallel arranged driver seat position shown in FIG. 4. Thus, the gap $\Delta 2$ is greater than the gap $\Delta 1$. The amount of inward angle shown in FIG. 7 is three degrees but even a very small inward angle such as one degree will produce a useful increase of 0.0147 m in the gap between the foot of the driver OP1 and the adjacent side wall of the passenger compartment P'.

It will be appreciated that the central longitudinal axis x'3-x'3 of the front seat 110 intersects the central longitudinal axis X-X of the motor vehicle 101 or an extension of that axis at a position in front of the front seat 110.

There are two ways in which this rotational benefit can be applied. Firstly, if the gap $\Delta 1$ available using a parallel arranged front seat 110 is already sufficient to meet any regulatory or use requirements, it may be possible to reduce the overall width of the passenger compartment P' by inwardly rotating the front seat 110 by a small amount such as, for example 1 degree. Whether any gains are available will depend upon whether there are any other constraints on passenger compartment width such as a width of the passenger compartment at shoulder height and the shape of the passenger compartment P'.

A second and potentially more advantageous use is when the passenger compartment P' has been optimized for width but the gap $\Delta 1$ available using a parallel arranged front seat 110 is not sufficient to meet regulatory or use requirements. In such a situation the width of the passenger compartment P' in the region of the driver foot well may be increased and this may be difficult to achieve without the repositioning of other components such as suspension parts or the front wheels that are adjacent the foot well. Increasing the width of a foot well is potentially problematic in the case of a compact motor vehicle because it will normally impinge upon the size of an adjacent wheel arch for one of the road wheels 106. If the wheel arch has to be reduced in size then a turning circle of the motor vehicle 101 may be increased due to a reduction in the space provided for the respective wheel 106 to turn in.

However, by turning the front seat 110 inwardly in accordance with this invention, the gap can be increased from $\Delta 1$ to $\Delta 2$ which is sufficient to meet regulatory or use requirements. This increase can be achieved without the need to increase the overall width of the passenger compartment P' and without incurring any consequences of such an increase in passenger compartment width.

The rear seat 120 is turned outwardly such that a central longitudinal axis x'4-x'4 of the rear seat 120 is rotated outwardly so as to lie at a small outward angle α. The small outward angle α is in the range of 0.5 to 10 degrees with respect to the central longitudinal axis X-X. this turning results in the central longitudinal axis of the rear seat 120 moving from the parallel position x'2-x'2 to the rotated position indicated by the line x'4'-x'4.

The central longitudinal axis x'4-x'4 passes through a mid-point of the seat squab 121 at a rear edge of the seat squab 121 so that half of the width of the seat squab 121 lies on each side of the respective mid-point.

The rotated central longitudinal axis x'4-x'4 of the rear seat 120 intersects the central longitudinal axis X-X of the vehicle 101 or an extension of that axis at a position $P_{OF}$1 to the rear of the rear seat 120.

The rear seat 120 is positioned such that its central longitudinal axis x'4-x'4 as measured at a rear edge of the seat squab 121 of the rear seat 120 is mounted closer to the central longitudinal axis X-X of the passenger vehicle 101 than would be possible with a symmetrical side-by-side seating arrangement. This is achieved by mounting the respective seat 120 a distance t2', measured from the central longitudinal axis x'4-x'4 at a rear edge of the rear seat 120 to the central longitudinal axis X-X of the passenger vehicle 101, that is less than half the width of the rear seat 120.

For example, if the width of the rear seat 120 is 0.44 m, then the distance from the central longitudinal axis x'4-x'4 at the rear edge of the rear seat 120 to the central longitudinal axis X-X of the passenger vehicle 101 is less than 0.22 m.

By rotating or turning the rear seat 120 outwardly more leg room is provided for the passenger OP2 because their legs are turned away from the legs of the driver OP1. It will be appreciated that the angle α has to be relatively small to meet current vehicle regulations and to prevent the feet of the passenger OP2 impinging against the side of the passenger compartment P'. The small outward angle α of the rear seat 120 was set in one embodiment to 7 degrees.

Because a seated body is wider at the hips than at the feet typically by 150-250 mm, an occupant can be turned outwards without increasing the width of the car by half of the 150-250 mm distance, i.e. 75-125 mm. This equates to a turn of 5-9 degrees for a typical seating height and 95% percentile male. The legal limit is 10 degrees.

It follows, that by making use of the legal rotation limit, the feet can be brought outboards to the outboard extent of the hips, thereby creating space inboards of the feet without widening the vehicle assuming that the vehicle width at the feet is the same as the width as at the hips, As before, the seat squab 111 is mounted at a height h that provides a floor to H-point height H in a general range of 0.375 m to 0.495 m but may be in a range of 0.4 to 0.45 m a good result can be achieved. The equivalent seat heights are 0.28 to 0.4 m for the general range and 0.305 to 0.355 m for the desired range.

Figure 8:
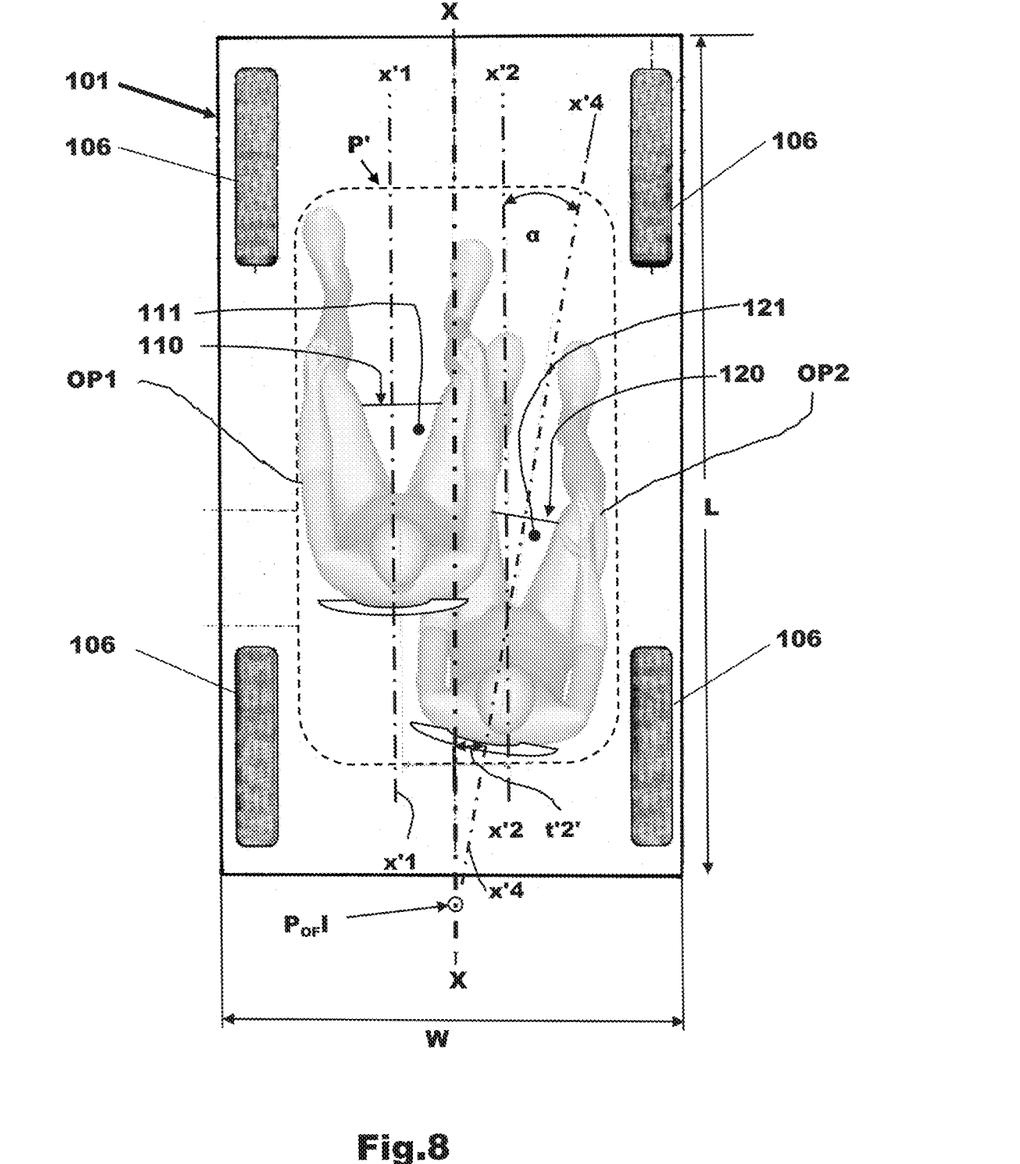
FIG. 8 is a top plan view similar to FIG. 4 showing a motor vehicle according to the second aspect of the invention including a second embodiment of a seating arrangement according to the first aspect of the invention.

With reference now to FIG. 8 there is shown a second embodiment of a seating arrangement according to the invention. This embodiment is in many respects identical to that previously described with reference to FIGS. 4-6 and FIG. 7 with the exception that it is the rear seat 120 that is not aligned parallel to the longitudinal axis X-X of the motor vehicle 101, the front seat 110 is arranged parallel as for the embodiment shown in FIGS. 4 to 6.

The same reference numerals are used for like parts.

The motor vehicle 101 can have a flat floor or a stepped floor as shown in FIGS. 4-6.

The position of the central longitudinal axis x'1-x'1 of the front seat 110 is the same as that shown in FIGS. 4-6 and is arranged parallel to the central longitudinal axis X-X of the vehicle 101.

As before, the central longitudinal axis x'4-x'4 passes through a mid-point of the seat squab 121 at a rear edge of the seat squab 121 so that half of the width of the seat squab 121 lies on each side of the respective mid-point and the central longitudinal axis x'1-x'1 of the front seat 110 passes through a mid-point of the seat squab 111 at a rear edge of the seat squab 111 so that half of the width of the seat squab 111 lies on each side of the mid-point.

In the case of this second embodiment, the rear seat 120 is turned outwards in the manner previously referred to with respect to FIG. 7 such that the central longitudinal axis x'4-x'4 of the rear seat 120 is rotated outwardly so as to lie at a small outward angle α. This small outward angle α lies in the range of 0.1 to 10 degrees with respect to the central longitudinal axis X-X. The central longitudinal axis of the rear seat 120 has therefore been moved from the parallel position x'2-x'2 to the rotated position indicated by the line x'4'-x'4.

The rotated central longitudinal axis x'4-x'4 of the rear seat 120 intersects the central longitudinal axis X-X of the vehicle 101 or an extension of that axis at a position $P_{OF}1$ to the rear of the rear seat 120.

The rear seat 120 is positioned such that its central longitudinal axis x'4-x'4 as measured at a rear edge of the seat squab 121 of the rear seat 120 is mounted closer to the central longitudinal axis X-X of the passenger vehicle 101 than would be possible with a symmetrical side-by-side seating arrangement. This is achieved by mounting the respective seat 120 a distance t'2', measured from the central longitudinal axis x'4-x'4 of the rear seat 120 at a rear edge of the seat squab 121 of the rear seat 120 to the central longitudinal axis X-X of the passenger vehicle 101 that is less than half the width of the rear seat 120.

For example, if the width of the rear seat 120 is 0.5 m, then the distance from the central longitudinal axis x'4-x'4 at the rear edge of the rear seat 120 to the central longitudinal axis X-X of the passenger vehicle 101 is less than 0.25 m.

By rotating the rear seat 120 outwardly more leg room is provided for the passenger OP2 because their legs are turned away from the legs of the driver OP1. It will be appreciated that the angle α has to be relatively small to meet current vehicle regulations and to prevent the feet of the passenger OP2 impinging against the side of the passenger compartment P.

Both seats 110, 120 can have their respective central longitudinal axes x'1-x'1; x'4-x'4 measured at the rear edge of the respective seat 110, 120 positioned from the central longitudinal axis X-X of the passenger vehicle 101 a distance that is less than half the width of the respective seat 110, 120.

For example, if the width of both seats 110, 120 is 0.44 m, the distance from the central longitudinal axis x'1-x'1 and x'4-x'4 at the rear edge of the respective seat 110, 120 to the central longitudinal axis X-X of the passenger vehicle 101 is less than 0.22 m.

As before, the seat squab 111 is mounted at a height h that provides a heel to floor contact point to H-point height H in a general range of 0.375 m to 0.495 m but may be in a range of 0.4 to 0.45 m a good result can be achieved. The equivalent undeflected seat squab heights are 0.28 to 0.4 m for the general range and 0.305 to 0.355 m for the desired range.

In accordance with a third embodiment of the invention that is similar to those previously described with reference to FIGS. 7 and 8 an inwardly rotated front seat is used with a rear seat that is arranged parallel to the longitudinal axis X-X of the motor vehicle 101 as shown in FIG. 4.

This provides the advantage that the distance from a foot of the driver to the adjacent wall of the foot well can be increased without increasing the width of the passenger compartment. A very small inward turning of the driver's seat can produce a worthwhile gain in foot clearance. For example, turning the driver's seat inwardly by 1 degree may result in extra clearance of approximately 0.015 m.

Whether a seat is high mounted depends upon the vertical height H between the respective heel contact point $H_{CP}$ and the respective H-point and not the height of the respective seat squab above the floor upon which the seat is mounted nor the height of the seat squab above the road.

Therefore by rotating one or both of the seats can assist with providing a comfortable position while minimizing the width of the passenger compartment.

It will also be appreciated that although the squabs of the two seats are as shown as simple rectangles this need not be the case and at least one of the squabs could be shaped to assist with meeting a seat stagger distance and lateral seat spacing. For example, a front inboard corner of the rear seat and a rear inboard corner of the front seat may be relieved or cutaway to facilitate the meeting of a desired seat spacing or outboard rear corners of the seat squabs could be relieved or cutaway to avoid interference with the body structure defining the passenger compartment. As another example, at least one of the seat squabs could have curved sides or be of a truncated oval shape so that it is narrower at respective front and rear edges than it is in a central portion between the front and rear edges.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is for illustrative purposes. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A seating assembly for a vehicle comprising:
a central longitudinal axis extending through the vehicle;
a front seat configured for use by a driver and defining a front seat central longitudinal axis;
a rear seat configured for use by a passenger and defining a rear seat central longitudinal axis, wherein the front and rear seats are substantially arranged on opposite sides of the central longitudinal axis in a staggered relationship, and wherein the central longitudinal axis of the front seat is arranged at a different angle with respect to the central longitudinal axis of the vehicle than the central longitudinal axis of the rear seat, and wherein at least one of the seats is positioned such that the central longitudinal axis of the respective seat measured at a rear edge of the seat is mounted closer to the central longitudinal axis of the vehicle than is possible with a symmetrical side-by-side seating arrangement.

2. The seating assembly of claim 1, wherein at least one of the seats is positioned such that a distance measured from the central longitudinal axis of the respective seat at the rear edge of the seat to the central longitudinal axis of the vehicle is less than half the width of the respective seat.

3. The seating assembly of claim 1, wherein the distance of the central longitudinal axes of both seats when measured at the rear edge of the respective seat from the central longitudinal axis of the vehicle is less than half the width of the respective seat.

4. The seating assembly of claim 1, wherein the central longitudinal axis of the front seat is arranged parallel to the central longitudinal axis of the vehicle and the rear seat is turned outwardly so that the central longitudinal axis of the rear seat is arranged at a small outwardly turned angle with respect to the central longitudinal axis of the vehicle.

5. The seating assembly of claim 1, wherein the front seat is turned inwardly so that the central longitudinal axis of the front seat is arranged at a small inwardly turned angle with respect to the central longitudinal axis of the vehicle and the rear seat is turned outwardly so that the central longitudinal axis of the rear seat is arranged at a small outwardly turned angle with respect to the central longitudinal axis of the vehicle.

6. The seating assembly of claim 1, wherein the front seat is turned inwardly so that the central longitudinal axis of the front seat is arranged at a small inwardly turned angle with respect to the central longitudinal axis of the vehicle and the central longitudinal axis of the rear seat is arranged parallel with respect to the central longitudinal axis of the vehicle.

7. The seating assembly of claim 1, wherein the central longitudinal axis of the rear seat intersects one of the central longitudinal axis of the vehicle and an extension of the central longitudinal axis of the vehicle at a position to the rear of the rear seat.

8. The seating assembly of claim 1, wherein the central longitudinal axis of the front seat intersects one of the central longitudinal axis of the vehicle and an extension of the central longitudinal axis of the vehicle at a position in front of the front seat.

9. The seating assembly of claim 1, wherein at least the front seat is mounted high so as to have an H-point height measured with respect to a heel contact point in a range of between 0.375 m and 0.495 m.

10. A seating assembly for a vehicle comprising:
a vehicular central longitudinal axis;
a front seat and a rear seat, each defining a central longitudinal axis;

the front and rear seats being substantially arranged on opposite sides of the vehicular central longitudinal axis in a staggered relationship, the front seat central longitudinal axis being arranged at a different angle relative to the vehicular central longitudinal axis than the rear seat central longitudinal axis.

11. The seating assembly of claim 10, wherein at least one of the seats is positioned such that a distance measured from the central longitudinal axis of the respective seat at a rear edge of the seat to the vehicular central longitudinal axis is less than half the width of the respective seat.

12. The seating assembly of claim 10, wherein the distance of the central longitudinal axes of both seats when measured at the rear edge of the respective seat from the vehicular central longitudinal axis is less than half the width of the respective seat.

13. The seating assembly of claim 10, wherein the central longitudinal axis of the front seat is arranged parallel to the vehicular central longitudinal axis and the rear seat is turned outwardly so that the central longitudinal axis of the rear seat is arranged at an outwardly turned angle with respect to the vehicular central longitudinal axis.

14. The seating assembly of claim 10, wherein the front seat is turned inwardly so that the central longitudinal axis of the front seat is arranged at a small inwardly turned angle with respect to the vehicular central longitudinal axis and the rear seat is turned outwardly so that the central longitudinal axis of the rear seat is arranged at an outwardly turned angle with respect to the vehicular central longitudinal axis.

15. The seating assembly of claim 10, wherein the front seat is turned inwardly so that the central longitudinal axis of the front seat is arranged at a small inwardly turned angle with respect to the vehicular central longitudinal axis and the central longitudinal axis of the rear seat is arranged parallel with respect to the vehicular central longitudinal axis.

16. The seating assembly of claim 10, wherein the central longitudinal axis of the rear seat intersects the vehicular central longitudinal axis at a position to the rear of the rear seat.

17. The seating assembly of claim 10, wherein the central longitudinal axis of the front seat intersects the vehicular central longitudinal axis at a position in front of the front seat.

18. The seating assembly of claim 10, wherein at least the front seat is mounted high so as to have an H-point height measured with respect to a heel contact point in a range of 0.375 m to 0.495 m.

19. A seating assembly for a vehicle comprising:
a vehicular central longitudinal axis;
a front seat and a rear seat, each defining a central longitudinal axis;
the front and rear seats being substantially arranged on opposite sides of the vehicular central longitudinal axis in a staggered relationship, the central longitudinal axis of the front seat being arranged at a different angle relative to the vehicular central longitudinal axis than the central longitudinal axis of the rear seat; and
wherein the distance of the central longitudinal axes of both seats when measured at a rear edge of the respective seat from the vehicular central longitudinal axis is less than half the width of the respective seat.

20. The seating assembly of claim 19, wherein the central longitudinal axis of the rear seat intersects the vehicular central longitudinal axis at a position to the rear of the rear seat and the central longitudinal axis of the front seat intersects the vehicular central longitudinal axis at a position in front of the front seat.

* * * * *